United States Patent [19]

Grouw, III

[11] Patent Number: 4,759,386

[45] Date of Patent: Jul. 26, 1988

[54] ELECTROMECHANICAL LINEAR ACTUATOR

[75] Inventor: Albert V. Grouw, III, North Haledon, N.J.

[73] Assignee: Pennwalt Corporation, Philadelphia, Pa.

[21] Appl. No.: 4,730

[22] Filed: Jan. 20, 1987

[51] Int. Cl.⁴ .......................................... F16K 37/00
[52] U.S. Cl. .............................. 137/554; 251/129.03; 251/129.12; 251/250; 137/93
[58] Field of Search ............... 251/129.03, 129.04, 251/129.12, 250; 137/554, 93; 210/169

[56] References Cited

U.S. PATENT DOCUMENTS

| | | | |
|---|---|---|---|
| 1,895,880 | 1/1933 | Cummings | 251/129.04 |
| 1,905,884 | 4/1933 | Beam | 251/129.03 |
| 2,954,703 | 11/1960 | Morrell | 251/129.03 |
| 3,189,700 | 6/1965 | Eidson | 200/61.86 |
| 3,258,985 | 7/1966 | Jordan | 251/129.12 |
| 3,290,998 | 12/1966 | Clements et al. | 91/1 |
| 3,303,299 | 2/1967 | Raymond, Jr. | 200/47 |
| 3,439,706 | 4/1969 | Barrett | 137/554 |
| 3,660,704 | 5/1972 | Paine et al. | 310/80 |
| 3,703,673 | 11/1972 | Balz | 251/129.12 |
| 3,706,321 | 12/1972 | Vicari | 137/554 |
| 3,789,875 | 2/1974 | McGee | 137/553 |
| 3,898,399 | 8/1975 | Yasui et al. | 200/47 |
| 3,908,959 | 9/1975 | Fichtner | 251/129.03 |
| 4,232,700 | 11/1980 | Sutt | 137/93 |
| 4,274,038 | 6/1981 | Sawyer | 318/663 |
| 4,311,946 | 1/1982 | Pathmann | 318/663 |
| 4,323,092 | 4/1982 | Zabel | 137/93 |
| 4,361,308 | 11/1982 | Buss | 251/129.12 |
| 4,460,154 | 7/1984 | Kunkle | 251/130 |
| 4,463,291 | 7/1984 | Usry | 318/254 |
| 4,481,451 | 11/1984 | Kautz et al. | 318/628 |
| 4,489,248 | 12/1984 | Petersen | 310/76 |
| 4,500,805 | 2/1985 | Swanson | 310/80 |
| 4,521,707 | 6/1985 | Baker | 310/80 |
| 4,546,295 | 10/1985 | Wickham et al. | 318/372 |

FOREIGN PATENT DOCUMENTS

| | | | |
|---|---|---|---|
| 1910446 | 9/1970 | Fed. Rep. of Germany | 251/129.04 |
| 2076507 | 12/1981 | United Kingdom | 251/250 |
| 2132032 | 6/1984 | United Kingdom | 251/129.04 |

OTHER PUBLICATIONS

Pennwalt/Wallace & Tiernan/A-741-G catalog insert (4 sides) (with attached English translation of textual portion) 01/86.

Primary Examiner—A. Michael Chambers
Attorney, Agent, or Firm—Panitch, Schwarze, Jacobs & Nadel

[57] ABSTRACT

Electrochemical linear actuator for automatically controlling a gas feeder linear motion valve, for example, is provided with a readily accessible and simple to operate manual override capability, while yet affording accurate position indication of the linear motion valve being controlled in both automatic and manual modes of operation.

20 Claims, 3 Drawing Sheets

ELECTROMECHANICAL LINEAR ACTUATOR

STATEMENT OF THE INVENTION

This invention relates to electromechanical linear actuators and more particularly to such actuators having a manual override capability and accurate position indication of the actuated device during automatic and manual operating modes of the actuator.

BACKGROUND AND SUMMARY OF THE INVENTION

Electromechanical linear actuators are well known and have many and diverse uses. For example, in the treatment of potable waters, linear motion valve actuators often serve to regulate the feedrate of a gas feeder, typically chlorine, to the potable waters for disinfection thereof.

In the regulation or control of a linear motion valve feeding chlorine gas to potable waters, for example, a conventional analyzer, disposed externally to the present actuator, generates signals indicative of the quantity of residual chlorine in the water. A controller, maintained at a desired set-point of residual chlorine, receives the analyzer signals and compares the analyzed residual chlorine in the treated water with a desired residual chlorine preset into the controller. The controller generates A.C. signals in response to the comparison; these signals are fed to a reversible A.C. motor associated with the present actuator mechanism. The motor positions an output rack which functions to control the chlorine feed valve. Thus, if a higher residual is desired, the controller will cause the motor to run in a forward direction to open, or further open the linear motion valve, and conversely when the residual is to be reduced.

It is desirable in such applications that an accurate indication of valve position be made known to the controller and operator. Further, the manual override means of any automatically controlled electromechanical linear actuator should be readily accessible to the operator as well as simple to operate.

The present actuator device maintains a valve position indicator, and an output rack indicative of the output of the valve, directly coupled in both automatic and manual operation modes. Mode change, i.e., automatic to manual, or vice versa, may easily be made by the simple expediency of moving a knob. The linear actuating device may be mounted in a gas feeder cabinet, for example, where the knob is readily accessible from a front panel thereof.

DETAILED DESCRIPTION OF THE INVENTION

Figure 1:
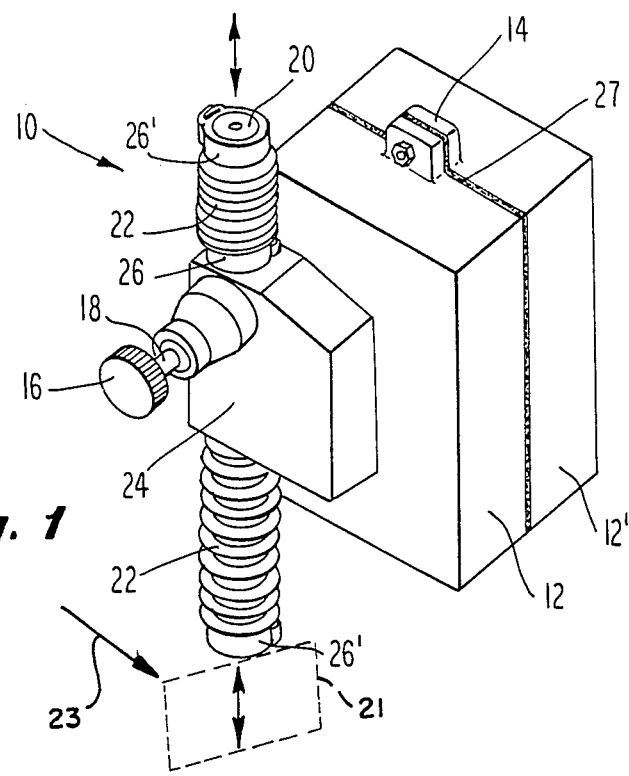
FIG. 1 is a perspective view of the assembled electromechanical linear actuator of the present invention.

FIG. 1 of the drawings illustrates the present actuator 10 provided with a housing of mating halves 12—12', suitably plastic, and means 14 for joining them prior to mounting to a gas feeder cabinet (not shown), for example. A knob 16, readily accessible to an operator, is pulled to manually override automatic operation of the actuator. Rotation of knob 16 causes main rotating shaft 18 to rotate therewith, causing an output rack member 20 (FIG. 3) to travel for control of the linear motion valve 21 (in phantom) which regulates the feedrate of chlorine gas (indicated by arrow 23) to the water. Rack 20 is protected from dirt and contaminants by a pair of bellows 22—22 secured to gear housing unit 24 by clamps 26—26 at their inner ends, and to the outer ends of rack 20 by clamps 26'—26'. Thus, movement of the rack (and bellows) in either direction controls the gas feeder linear motion valve 21 (inspection) by suitable or conventional means. A gasket 27 is provided between the housings 12—12'.

Figure 2:
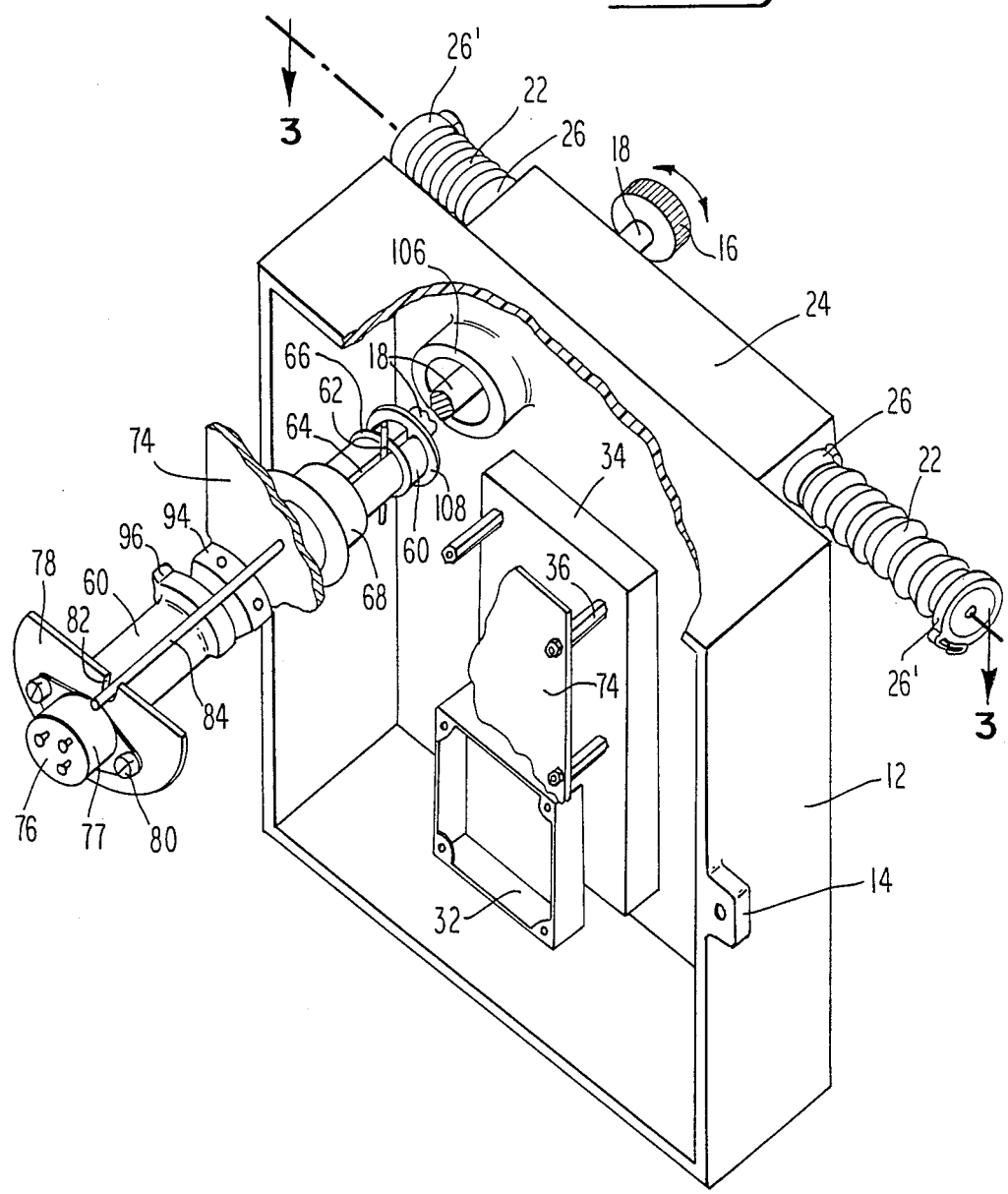
FIG. 2 is a broken-away perspective view of a portion of the actuator of FIG. 1, the main rotating shaft shown severed, and components associated with the severed shaft enlarged for purposes of clarity of illustration.
Figure 3:
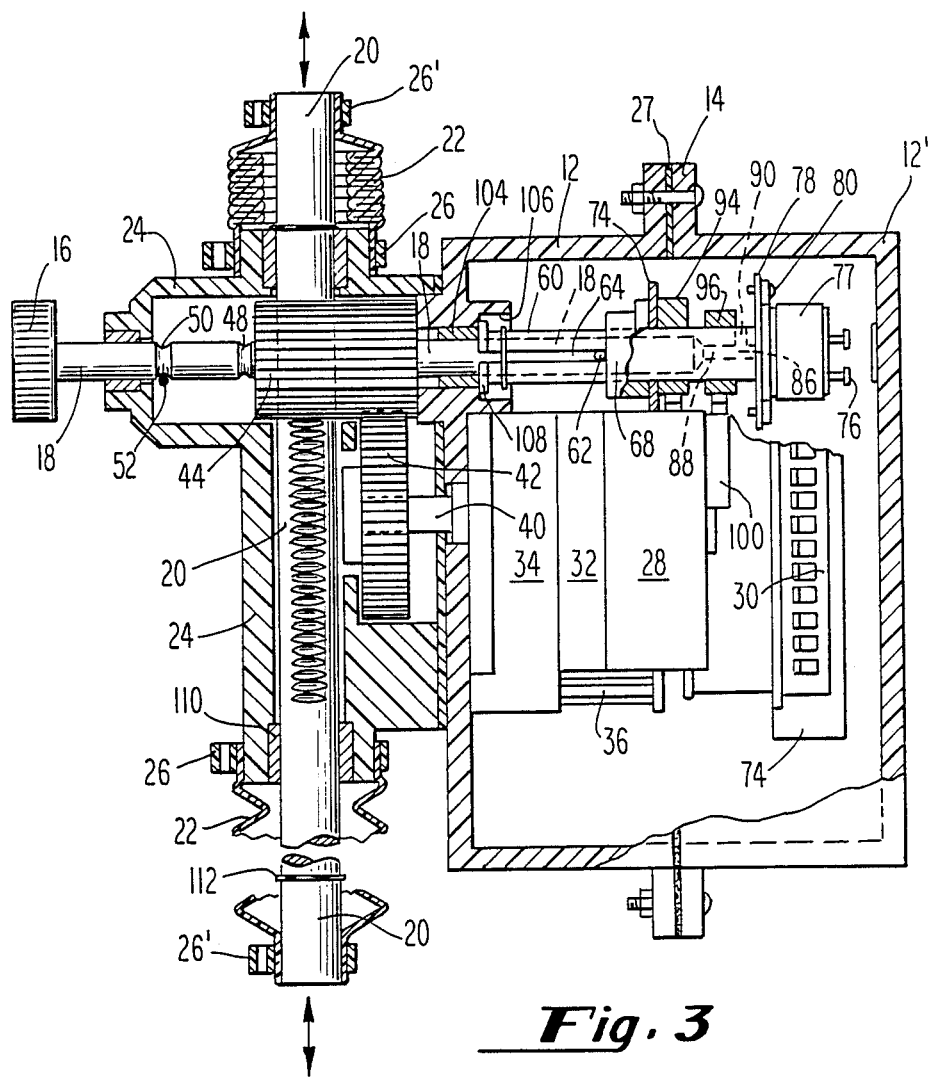
FIG. 3 is a broken-away partially sectioned and partially diagrammatic view of the actuator of FIG. 2 taken along line 3—3 thereof, portions in phantom, the main rotating shaft and components associated therewith shown partially sectioned and part in phantom.

Referring now to FIGS. 2 and 3, alternating current from a suitable source (not shown) supplies power to a reversible permanent split capacitor motor 28 through terminal strip 30. Motor 28 is typically 115 volts, 60 cycle, 1.14 rpm, with continuous duty 40 inch-pounds starting torque. Motor 28 is screw mounted within motor mount 32 integrally formed to gear box 34 secured to gear housing unit 24 through housing 12 by a plurality of threaded spacers 36.

Drive shaft 40 of motor 28 is provided with gear 42 which coacts with pinion 44 secured to main rotating shaft 18. Rotation of pinion 44 causes output rack 20 to travel depending upon the direction of rotation of drive shaft 40. Pinion 44 is suitably made of plastic to obviate any need for lubrication between it and gear 42 and rack 20.

Figure 5:
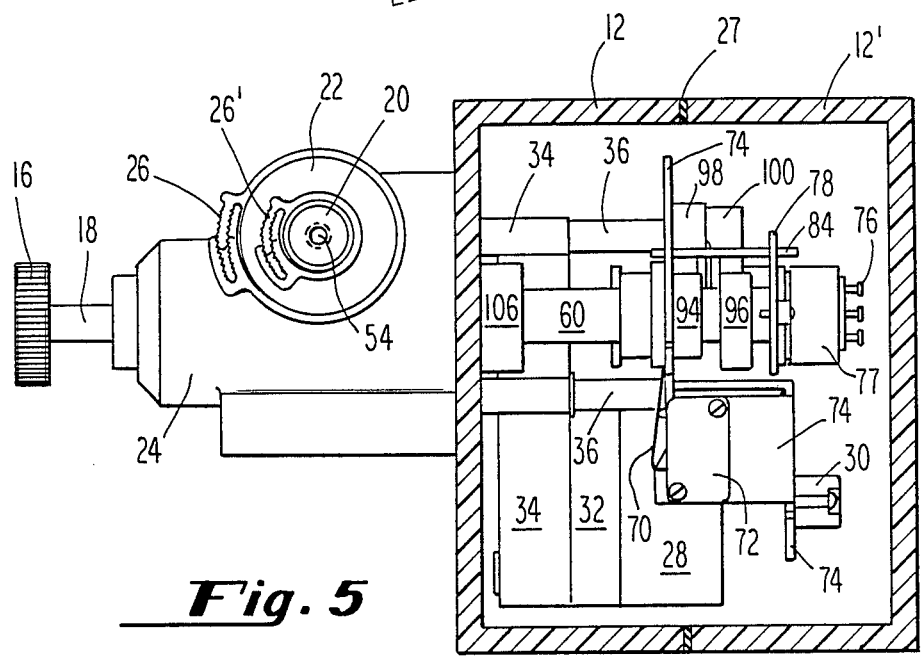
FIG. 5 is a elevational view of the actuator of FIG. 3, the actuator housing shown in section and portions of the actuator removed for clarity of illustration.
Figure 4:
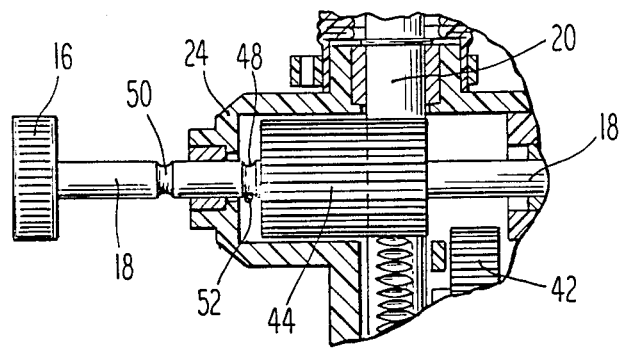
FIG. 4 is a fragmentary view of FIG. 3 illustrating the actuator in a manual override mode.

Main rotating shaft 18 is provided with an inner transverse recess 48 and an outer transverse recess 50, both of which are capable of engaging projection 52 secured to gear housing unit 24. Thus, in the embodiment illustrated in FIG. 3, projection 52 is engaged within outer recess 50 permitting automatic operation of the present linear actuator 10. When knob 16 is pulled, as illustrated in FIG. 4 of the drawings, projection 52 engages inner recess 48 of main rotating shaft 18, causing pinion 44 to be disengaged from gear 42. The engagement of the pinon 44 with the rack 20 is maintained allowing rotation of knob 16 to rotate pinion 44, secured to main rotating shaft 18 to cause rack 20 to move for manual control of the gas feeder linear motion valve. Rack 20 is provided with internal threads 54 at each end thereof (FIG. 5) to facilitate connection to the linear motion valve.

Manual override may be desirable in several instances, i.e., where an operator desires to increase or decrease the residual chlorine in the treated water above or below the predetermined set-point respectively, where the volume of water being treated is suddenly changed, where electrical power fails, and the like.

The position indicating means for both manual and automatic operation of the present actuator is clearly shown in the drawings, and more particularly to FIG. 2 thereof. In either mode of operation, main rotating shaft 18 is rotatable in either direction. Shaft 18 is secured within sleeve 60 by means of pin 62 pressed into a hole provided in shaft 18 while engaging a longitudinal slot 64 formed through sleeve 60. Thus, rotation of shaft 18 rotates sleeve 60 accordingly. Retainer ring 66, disposed around an inner portion of sleeve 60, functions to pinch sleeve 60 onto shaft 18. A plastic spacer member 68 is positioned outwardly of pin 62 and is caused to fit loosely or float around sleeve 60. When knob 16 is pushed towards housing 12 such that outer recess 50 is engaged by projection 52, as depicted in FIG. 3 of the drawings, pin 62 slides along slot 64 to urge the outer surfaces of spacer 68 to contact spring lever 70 (FIG. 5) of normally open switch 72 to thereby close a position feedback circuit, later described, and allows motor 28 of the actuator to operate in the automatic mode. Switch 72 is mounted on the multiangled bracket member 74 which is threadedly attached to spacers 36. When it is desired to manually override the automatic mode of operation, knob 16 will merely be pulled (FIG. 4) to cause pin 62 to retract along slot 64 to abut well 106 while projection 52 engages inner recess 48, allowing lever 70 of switch 72 to return to its relaxed position while pushing floating spacer member 68 inwardly along sleeve 60 and disposing switch 72 back to its normally open position, thus opening the circuit and removing the supply of power to the motor 28.

At the outermost end of sleeve 60 is positioned a feedback or position indicating potentiometer 76 screw mounted to a plate 78 by screws 80. Plate 78 is provided with a slot 82 which receives rod 84 extending outwardly from bracket 74. Plate 78 and rod 84 prevent potentiometer case 77 from rotating, i.e., even though shaft 18 and sleeve 60 are rotating, potentiometer case 77 will not rotate therewith. Potentiometer shaft 86 (FIG. 3) is secured within a central passageway 88 formed at the outer end of sleeve 60 by means of a set screw 90.

Attached to potentiometer shaft 86 is a conventional internal wiper which rotaes with the rotation of main rotating shaft 18 and sleeve 60, enabling potentiometer 76 to provide a linear voltage responsive to the position of output rack 20, if a constant current is applied across the potentiometer, due to the synchronous movement of the wiper and rack. Thus, any change in the resistance of the potentiometer is precisely correlated to any change in position of the output rack.

Gear backlash between rack 20 and pinion 44 is made to equal the clearance distance between pin 62 and slot 64 in sleeve 60 to thereby eliminate possible potentiometer position indicating errors when the direction of rotation of the main rotating shaft and sleeve is reversed.

Cams 94 and 96 are secured to sleeve 60 inwardly potentiometer mounting plate 78, rotate with the sleeve, and function to contact normally closed limit switches 98 and 100 respectively, mounted to bracket 74 (FIG. 5), to limit linear travel of output rack 20 in either direction of opening motor 28 operating circuit located within housing 12—12'. The motor operating circuit includes the two energizing leads of the a.c. reversible motor 28, each in series with a limit switch 98 or 100. The position feedback circuit, also located within housing 12—12', includes the feeback potentiometer 76 and switch 72.

A bearing member 104 for main rotating shaft 18 is disposed in the inner wall of housing 12 (FIG. 3). Well 106 is integrally formed with housing 12 and extends outwardly concentrically about bearing 104, providing mechanical support thereto while continuously housing therein a flange 108 (FIG. 2) formed at the innermost end of sleeve 60 whether the actuator is operating in automatic or manual mode. As mentioned above, well 106 is abutted by pin 62 when automatic operation of the actuator is manually overridden.

The use of a position indicating potentiometer for indicating positions of linear apparatus is known. The potentiometer may be connected directly to a suitable controller, described hereinabove, for position feedback and for visually indicating, typically, by dial, bar graph, or digital means, the exact position of the linear motion valve to be controlled.

Since output rack 20 moves in synchrony with the potentiometer wiper, in both manual and automatic modes, it is apparent that the precise positioning of the linear motion valve, regardless of direction of rotation of the shaft and sleeve, may readily be visually displayed.

Modification and changes may be made to the present device by one skilled in the art without departing from the spirit of the invention. For example, a bearing 110 (FIG. 3) adjacent an interior end portion of gear housing unit 24 may be contacted by a snap ring 112 disposed at an outer end of rack 20 to automatically stall motor 28 to provide an additional safety measure to the present actuator. A remote manual electrical switch could replace a controller. Switch 72 of the position feedback circuit would then be wired in series with common lead of motor 28. Additionally, another potentiometer may be suitably positioned on the present actuator for indicating position of the same linear device to another instrument, and so forth.

The present actuator may be adapted for use advantageously in other applications, such, for example, as controlling the stroke length of a diaphragm metering pump, the height of a table, platform, etc. to be raised, and the like.

I claim:

1. An actuator for the control of a device by linear motion imparted thereto from said actuator comprising:
   a motor having a drive shaft, and means for supplying power to said motor for rotation of said drive shaft,
   gear means rotating in response to rotation of said drive shaft,
   pinion means for engaging said gear means and rotating in response to rotation of said gear means,
   a rack for engaging said pinion means and moving linearly in response to rotation of said pinion means,
   a knob and a knob shaft, said knob, said knob shaft and said pinion means being in aligned secured together relationship for manually disengaging said pinion means from said gear means while simultaneously removing said supply of power to said motor and for constantly maintaining engagement of said pinion means with said rack whereby rotation manually of said knob causes said rack to move linearly.

2. Actuator of claim 1 further including position indicating means comprising:
   an elongate sleeve having a longitudinal slot disposed therethrough towards a forward portion thereof,
   pin means disposed through said slot and transversely through said sleeve and knob shaft, said sleeve, knob shaft and pinion means rotating in accordance with rotation of said knob, and a position indicating potentiometer mounted at a rearward end of said sleeve whereby rotation of said sleeve by rotation of said knob shaft and pinion means when said pinion means is disengaged from said gear means but engaged with said rack causes said potentiometer to produce a linear voltage in accordance with the position of said rack and indicative of the position of said device.

3. Actuator of claim 2 wherein said knob shaft with said pinion means secured thereto is rotated by said gear means engaging said pinoin means to thereby rotate said sleeve to cause said potentiometer to produce a linear voltage in accordance with position of said rack engaged by said pinion means and indicative of the position of said device.

4. Actuator of claim 2 wherein said potentiometer is provided with a shaft secured to said sleeve at a rearmost portion thereof whereby rotation of said sleeve by said knob shaft when said pinion means is disengaged from said gear means and engaged with said rack causes said potentiometer shaft and wiper affixed thereto to rotate in synchrony with the position of said rack and produce a linear voltage indicative of the position of said device.

5. The actuator of claim 3 wherein said potentiometer is provided with a shaft secured to said sleeve at a rearmost portion thereof whereby rotation of said sleeve by said knob shaft when said pinion means is engaged with said gear means and said rack, said knob shaft rotating in response to rotation of said motor drive shaft and gear means, causes said potentiometer shaft and wiper affixed thereto to rotate in synchrony with position of said rack and produce a linear voltage indicative of the position of said device.

6. Actuator of claim 3 further characterized by
a pair of cams mounted around said sleeve and a pair of normally closed limit switches mounted in proximate relationship to said cams whereby rotation of said sleeve by said knob shaft rotating in response to rotation of said motor drive shaft, gear means and pinion means in either direction of rotation causes one or the other of said limit switches to be opened by one or the other of said cams to thereby limit distance of travel of said rack in one direction or the other by opening said motor operating circuit.

7. Actuator of claim 2 further characterized by:
a housing for said actuator, said knob sahft extending through an opening in said housing, with said knob disposed exteriorly of said housing,
a forward recess and a rearward recess provided transversely around said knob shaft,
said knob being moveable in a direction toward and away from said housing,
a projection extending from said housing internally for engaging with said forward recess when said knob is moved in a direction towards said housing to cause said pinion means to be engaged by said gear means for linear movement of said rack in one direction or the other by said motor.

8. Actuator of claim 3 further characterized by:
a housing for said actuator, said knob shaft extending through an opening in said housing, with said knob disposed exteriorly of said housing,
a forward recess and a rearward recess provided transversely around said knob shaft,
said knob being movable in a direction toward and away from said housing wall,
a projection extending from said housing internally for engaging with said rearward recess when said knob is moved in a direction away from said housing to cause said gear means to disengage said pinion means for linear movement of said rack in one direction or the other by said knob.

9. Actuator of claim 1 wherein said device is a gas feeder linear motion valve and said actuator is an electromechanical linear actuator.

10. Actuator of claim 9 wherein said gas feeder linear motion valve feeds chlorine gas to potable waters for disinfection thereof.

11. Actuator of claim 1 wherein said knob and knob shaft are further adapted for re-engaging said pinion means with said gear means and reapplying said supply of power to the motor at any position of said rack whereby control of the position of the rack through the motor is immediately effected and reinstated.

12. An electromechanical linear actuator comprising:
a linear member;
a first rotary member drivingly engaging the linear member for moving the linear member linearly;
a second rotary member adjoining the first rotary member, the first rotary member being moveable into and out of driven engagement with the second rotary member while continuously in driving engagement with the linear member;
motor means coupled with the second rotary member for rotating the second rotary member and the first rotary member when the first rotary member is drivingly engaged with the second rotary member; and
position indicator means continuously coupled with the first rotary member for indicating the position of the linear member through the first rotary member when the first rotary member is engaged with and is disengaged from the second rotary member.

13. The electromechanical linear actuator of claim 12 wherein said position indicator means is rotatationally coupled with the first rotary member.

14. The electromechanical linear actuator of claim 12 further comprising compensation means coupled with the position indicator means for compensating for backlash between the linear member and the first rotary member.

15. The electromechanical actuator of claim 12 further comprising manual adjustment means coupled with the first rotary member and adapted for manually moving the first rotary member into and out of driven engagement with the second rotary member and for manually rotating the first rotary member.

16. The electromechanical linear actuator of claim 12 wherein the linear member comprises a rack, the first rotary member comprises a pinion engaging the rack and the second rotary member comprises a gear meshable with the pinion.

17. The electromechanical linear actuator of claim 16 further comprising compensation means for compensating the position indicator means for backlash between the pinion and the rack.

18. The electromechanical linear actuator of claim 17 wherein said compensation means comprises:
a first shaft extending coaxially through the pinion;
a second shaft extending coaxially with respect to the first shaft from the position indicator means; and coupling means for rotatably coupling the first and second shafts, the coupling means developing a backlash between the first and second shafts substantially equal to the backlash between the rack and pinion.

19. The electromechanical linear actuator of claim 18 wherein said coupling means comprises:

an engagement member extending radially from one of the first and second shafts; and a sleeve coupled with the other one of the first and second shafts and having an elongated opening for engaging with the engagement member.

20. The electromechanical linear actuator of claim 12 further comprising means for indicating engagement and disengagement positions of the first rotary member with the second rotary member.

* * * * *